United States Patent
Rached

(10) Patent No.: US 9,145,507 B2
(45) Date of Patent: Sep. 29, 2015

(54) COMPOSITIONS OF 2,4,4,4-TETRAFLUOROBUT-1-ENE AND CIS-1,1,1,4,4,4-HEXAFLUOROBUT-2-ENE

(75) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/117,700

(22) PCT Filed: May 15, 2012

(86) PCT No.: PCT/FR2012/051078
§ 371 (c)(1),
(2), (4) Date: Nov. 14, 2013

(87) PCT Pub. No.: WO2013/004930
PCT Pub. Date: Jan. 10, 2013

(65) Prior Publication Data
US 2014/0083119 A1    Mar. 27, 2014

(30) Foreign Application Priority Data

Jul. 1, 2011    (FR) .................................... 11 55952

(51) Int. Cl.
| | | |
|---|---|---|
| C09K 5/04 | (2006.01) | |
| C09K 3/00 | (2006.01) | |
| C08J 9/14 | (2006.01) | |
| C09K 3/30 | (2006.01) | |
| C11D 7/50 | (2006.01) | |
| C11D 17/00 | (2006.01) | |
| F25B 9/00 | (2006.01) | |

(52) U.S. Cl.
CPC . *C09K 3/00* (2013.01); *C08J 9/146* (2013.01); *C09K 3/30* (2013.01); *C09K 5/045* (2013.01); *C11D 7/505* (2013.01); *C11D 17/0043* (2013.01); *C08J 2203/162* (2013.01); *C08J 2203/182* (2013.01); *C09K 2205/126* (2013.01); *C09K 2205/22* (2013.01); *C09K 2205/32* (2013.01); *F25B 9/006* (2013.01)

(58) Field of Classification Search
CPC ............... C09K 5/045; C09K 2205/22; C09K 2205/43; F25B 39/02; F25B 45/00
USPC ............................. 252/67, 68, 69; 62/77, 119
See application file for complete search history.

(56) References Cited

U.S. PATENT DOCUMENTS

| | | |
|---|---|---|
| 5,076,064 A | 12/1991 | Kopko |
| 7,708,903 B2 | 5/2010 | Sievert et al. |
| 7,972,524 B2 | 7/2011 | Robin |
| 7,972,525 B2 | 7/2011 | Robin |
| 8,262,924 B2 | 9/2012 | Robin |
| 8,648,123 B2 | 2/2014 | Van Horn et al. |
| 2007/0096051 A1 | 5/2007 | Nappa et al. |
| 2007/0100009 A1 | 5/2007 | Creazzo et al. |
| 2007/0100010 A1 | 5/2007 | Creazzo et al. |
| 2007/0108403 A1 | 5/2007 | Sievert et al. |
| 2007/0187639 A1 | 8/2007 | Leck et al. |
| 2009/0143604 A1 | 6/2009 | Nappa et al. |
| 2009/0204444 A1 | 8/2009 | Tucker et al. |
| 2009/0302264 A1 | 12/2009 | Serrano et al. |
| 2010/0056124 A1 | 3/2010 | Keating et al. |
| 2010/0078585 A1 | 4/2010 | Robin |
| 2010/0112328 A1 | 5/2010 | Van Horn et al. |
| 2010/0154419 A1 | 6/2010 | Kontomaris |
| 2010/0163776 A1* | 7/2010 | Robin ............................... 252/2 |
| 2010/0216904 A1 | 8/2010 | Loh et al. |
| 2010/0243943 A1 | 9/2010 | Robin |
| 2010/0326095 A1 | 12/2010 | Van Horn et al. |
| 2011/0001080 A1 | 1/2011 | Van Horn et al. |
| 2011/0006248 A1 | 1/2011 | Van Horn et al. |
| 2011/0088418 A1 | 4/2011 | Kontomaris et al. |
| 2011/0144216 A1 | 6/2011 | Hulse et al. |
| 2011/0197604 A1 | 8/2011 | Minor et al. |
| 2011/0215273 A1* | 9/2011 | Uenveren et al. ............. 252/78.1 |
| 2011/0237844 A1* | 9/2011 | Tung et al. .................... 570/151 |
| 2011/0260093 A1 | 10/2011 | Robin |
| 2012/0004299 A1 | 1/2012 | Hulse et al. |

(Continued)

FOREIGN PATENT DOCUMENTS

| | | |
|---|---|---|
| JP | 2008-531836 A | 8/2008 |
| JP | 2010-522816 A | 7/2010 |
| JP | 2010-532395 A | 10/2010 |
| WO | WO 2006/094303 A2 | 9/2006 |
| WO | WO 2007/002625 A2 | 1/2007 |
| WO | WO 2007/002703 A2 | 1/2007 |
| WO | WO 2007/053697 A2 | 5/2007 |
| WO | WO 2008/121776 A1 | 10/2008 |
| WO | WO 2008/134061 A2 | 11/2008 |
| WO | WO 2008154612 A1 * | 12/2008 |
| WO | WO 2009/085937 A1 | 7/2009 |
| WO | WO 2009/108547 A1 | 9/2009 |

(Continued)

OTHER PUBLICATIONS

International Search Report (PCT/ISA/210) mailed on Aug. 28, 2012, by the French Patent Office as the International Searching Authority for International Application No. PCT/FR2012/051078.

(Continued)

Primary Examiner — Douglas McGinty
(74) Attorney, Agent, or Firm — Buchanan Ingersoll & Rooney P.C.

(57) ABSTRACT

A composition including 2,4,4,4-10-tetrafluorobut-1-ene and cis-1,1,1,4,4,4-hexafluorobut-2-ene, and also the use thereof in particular as a heat transfer fluid. The composition may include: from 1% to 99% of 2,4,4,4-tetrafluorobut-1-ene and from 1% to 99% of cis-1,1,1,4,4,4-hexafluorobut-2-ene; preferably from 5% to 70% of 2,4,4,4-tetrafluorobut-1-ene and from 30% to 95% of cis-1,1,1,4,4,4-hexafluorobut-2-ene; preferably from 20% to 65% of 2,4,4,4-tetrafluorobut-1-ene and from 35% to 80% of cis-1,1,1,4,4,4-hexafluorobut-2-ene; preferably from 25% to 60% of 2,4,4,4-tetrafluorobut-1-ene and from 40% to 75% of cis-1,1,1,4,4,4-hexafluorobut-2-ene; preferably from 28% to 51% of 2,4,4,4-tetrafluorobut-1-ene and from 49% to 72% of cis-1,1,1,4,4,4-hexafluorobut-2-ene.

24 Claims, 1 Drawing Sheet

(56) References Cited

U.S. PATENT DOCUMENTS

| | | | |
|---|---|---|---|
| 2012/0056124 A1 | 3/2012 | Robin | |
| 2012/0085959 A1 | 4/2012 | Uenveren et al. | |
| 2012/0117990 A1* | 5/2012 | Rached et al. | 62/115 |
| 2012/0119136 A1 | 5/2012 | Yana Motta et al. | |
| 2013/0098396 A1 | 4/2013 | Lousenberg et al. | |
| 2013/0099154 A1 | 4/2013 | Boussand et al. | |
| 2013/0104575 A1 | 5/2013 | Kontomaris | |
| 2013/0111970 A1 | 5/2013 | Johnsen | |
| 2013/0247602 A1* | 9/2013 | Boutier et al. | 62/115 |
| 2013/0255284 A1* | 10/2013 | Rached | 62/77 |
| 2013/0298581 A1 | 11/2013 | Kontomaris | |
| 2014/0048739 A1* | 2/2014 | Rached et al. | 252/67 |
| 2014/0083119 A1 | 3/2014 | Rached | |
| 2014/0191153 A1 | 7/2014 | Yana Motta et al. | |
| 2014/0284516 A1 | 9/2014 | Johnsen | |

FOREIGN PATENT DOCUMENTS

| | | |
|---|---|---|
| WO | WO 2009/114397 A2 | 9/2009 |
| WO | WO 2009/114398 A1 | 9/2009 |
| WO | WO 2010/055146 A2 | 5/2010 |
| WO | WO 2010/059677 A2 | 5/2010 |
| WO | WO 2010/062888 A2 | 6/2010 |
| WO | WO 2010/080467 A2 | 7/2010 |
| WO | WO 2010/100254 A1 | 9/2010 |
| WO | WO 2010/129461 A2 | 11/2010 |
| WO | WO 2010/141527 A1 | 12/2010 |
| WO | WO 2010/141669 A1 | 12/2010 |
| WO | WO 2011/015737 A1 | 2/2011 |
| WO | WO 2011/084447 A2 | 7/2011 |
| WO | WO 2011/084553 A2 | 7/2011 |
| WO | WO 2011/137087 A1 | 11/2011 |
| WO | WO 2012/069725 A1 | 5/2012 |
| WO | WO 2012064477 A2 * | 5/2012 |
| WO | WO 2012/072910 A2 | 6/2012 |
| WO | WO 2013/247602 A1 | 1/2013 |

OTHER PUBLICATIONS

Office Action issued by the European Patent office in EP 10 816 413.8, Apr. 28, 2014, 4 pages.

Kim, M.S., et al., "A Study to Determine the Existence of an Azeotropic R-22 'Drop-in' Substitute," NISTIR 5784, Mar. 1996, 50 pages, U.S. Department of Commerce.

Rached, U.S. Appl. No. 14/390,609 entitled "Compositions Based on 2,3,3,4,4,4-Hexafluorobut-1-ene," filed in the U.S. Patent and Trademark Office on Oct. 3, 2011.

* cited by examiner

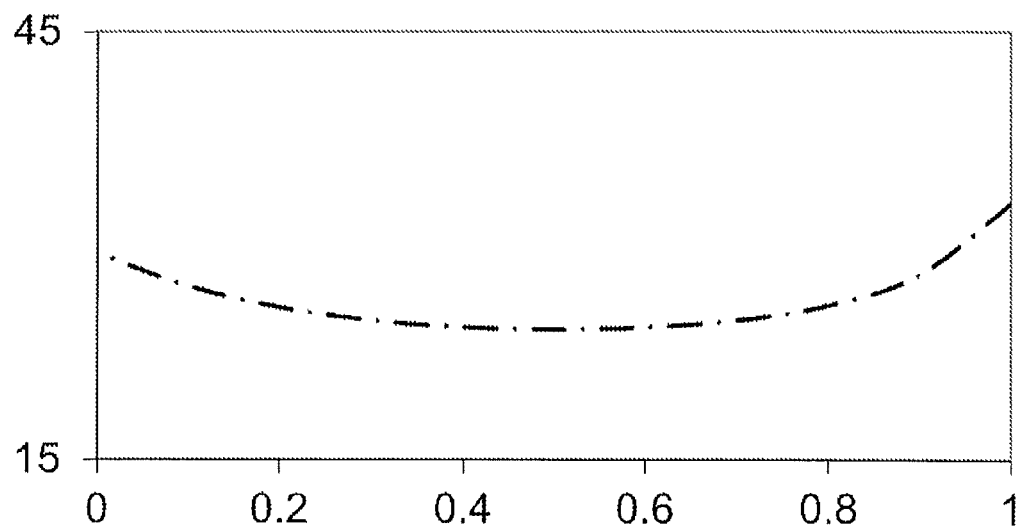

COMPOSITIONS OF 2,4,4,4-TETRAFLUOROBUT-1-ENE AND CIS-1,1,1,4,4,4-HEXAFLUOROBUT-2-ENE

FIELD OF THE INVENTION

The present invention relates to compositions of 2,4,4,4-tetrafluorobut-1-ene and cis-1,1,1,4,4,4-hexafluorobut-2-ene and to their use, in particular as heat-transfer fluids.

TECHNICAL BACKGROUND

Fluids based on fluorocarbon compounds are widely used in systems for the transfer of heat by compression of vapor, in particular air conditioning, heat pump, refrigeration or freezing devices. These devices have it in common that they are based on a thermodynamic cycle comprising the vaporization of the fluid at low pressure (in which the fluid absorbs heat); the compression of the vaporized fluid up to a high pressure; the condensation of the vaporized fluid to give a liquid at high pressure (in which the fluid discharges heat); and the reduction in pressure of the fluid in order to complete the cycle.

The choice of a heat-transfer fluid (which can be a pure compound or a mixture of compounds) is dictated, on the one hand, by the thermodynamic properties of the fluid and, on the other hand, by additional constraints. Thus, a particularly important criterion is that of the impact of the fluid under consideration on the environment. In particular, chlorinated compounds (chlorofluorocarbons and hydrochlorofluorocarbons) exhibit the disadvantage of damaging the ozone layer. Thus, nonchlorinated compounds, such as hydrofluorocarbons, fluoroethers and fluoroolefins, are from now on generally preferred to them.

It is also still necessary to develop other heat-transfer fluids exhibiting a lower global warming potential (GWP) than that of the heat-transfer fluids currently used and exhibiting equivalent or improved performances.

The document U.S. Pat. No. 5,076,064 describes the replacement of trichlorofluoromethane (CFC-11) par other refrigerants in centrifugal compressors. The use of 2,2-dichloro-1,1,1-trifluoroethane (HCFC-123) is in particular provided in this document. However, it remains desirable to use refrigerants which are even less toxic to the ozone layer and which exhibit a lower GWP than HCFC-123.

The document WO 2010/141669 describes the use of cis-1,1,1,4,4,4-hexafluorobut-2-ene (or Z-HFO-1336mzz) as refrigerant, in particular as a replacement for CFC-11 and HCFC-123. However, the performance of this compound is unsatisfactory. In particular, its volumetric capacity is markedly lower than that of HCFC-123.

The document WO 2010/141527 describes azeotropic or quasi-azeotropic compositions comprising Z-HFO-1336mzz and another compound which can be ethanol, 2-chloro-3,3,3-trifluoropropene, methanol, trans-1,1,1,4,4,5,5,5-octafluoropent-2-ene, 2-bromo-3,3,3-trifluoropropene, methyl acetate, acetone, chloroform, n-hexane or 1-chloro-3,3,3-trifluoropropene. These mixtures are highly inflammable and/or are not suitable for the replacement of refrigerants such as HCFC-123.

The document WO 2010/100254 describes in a general way the use of mixtures of fluoroolefins of HFO-1354 and HFO-1336 type. The HFO-1354 can be 2,4,4,4-tetrafluorobut-1-ene and HFO-1336 can be HFO-1336 mzz. However, the isomeric form of the latter compound is not specified.

There still exists a need to develop other heat-transfer fluids which are less toxic to the ozone layer and which exhibit a relatively low GWP, in order to replace the ordinary heat-transfer fluids.

In particular, it is desirable to develop heat-transfer fluids having a low GWP which can replace HCFC-123 while offering similar, indeed improved, energy performances, it being possible for the replacement preferably to be carried out without modifying the existing installations or their operating parameters.

SUMMARY OF THE INVENTION

The invention relates first to a composition comprising 2,4,4,4-tetrafluorobut-1-ene and cis-1,1,1,4,4,4-hexafluorobut-2-ene.

According to one embodiment, the composition consists of a mixture of 2,4,4,4-tetrafluorobut-1-ene and cis-1,1,1,4,4,4-hexafluorobut-2-ene.

According to one embodiment, the composition comprises:
  from 1% to 99% of 2,4,4,4-tetrafluorobut-1-ene and from 1% to 99% of cis-1,1,1,4,4,4-hexafluorobut-2-ene;
  preferably from 5% to 70% of 2,4,4,4-tetrafluorobut-1-ene and from 30% to 95% of cis-1,1,1,4,4,4-hexafluorobut-2-ene;
  preferably from 20% to 65% of 2,4,4,4-tetrafluorobut-1-ene and from 35% to 80% of cis-1,1,1,4,4,4-hexafluorobut-2-ene;
  preferably from 25% to 60% of 2,4,4,4-tetrafluorobut-1-ene and from 40% to 75% of cis-1,1,1,4,4,4-hexafluorobut-2-ene;
  preferably from 28% to 51% of 2,4,4,4-tetrafluorobut-1-ene and from 49% to 72% of cis-1,1,1,4,4,4-hexafluorobut-2-ene.

According to one embodiment, the composition is quasi-azeotropic, preferably azeotropic.

The invention also relates to the use of the abovementioned composition as heat-transfer fluid.

According to one embodiment, the composition is quasi-azeotropic, preferably azeotropic.

According to one embodiment, the composition is nonflammable.

The invention also relates to a heat-transfer composition comprising the abovementioned composition and also one or more additives chosen from lubricants, stabilizing agents, surfactants, tracers, fluorescent agents, odorous agents, solubilizing agents and their mixtures.

The invention also relates to a heat-transfer installation comprising a vapor compression circuit containing the abovementioned composition as heat-transfer fluid or containing the abovementioned heat-transfer composition.

According to one embodiment, the installation comprises a centrifugal compressor and preferably a direct-drive centrifugal compressor.

According to one embodiment, the installation comprises a flooded evaporator.

According to one embodiment, the installation is chosen from mobile or stationary installations for heat-pump heating, air conditioning, in particular motor vehicle air conditioning or centralized stationary air conditioning, refrigeration or freezing and Rankine cycles and is preferably an air conditioning installation.

The invention also relates to a process for heating or cooling a liquid or a body by means of a vapor compression circuit containing a heat-transfer fluid, said process successively comprising the evaporation of the heat-transfer fluid, the compression of the heat-transfer fluid, the condensation of the heat fluid and the reduction in pressure of the heat-transfer fluid, in which the heat-transfer fluid is a composition as described above.

The invention also relates to a process for reducing the environmental impact of a heat-transfer installation comprising a vapor compression circuit containing an initial heat-transfer fluid, said process comprising a stage of replacement of the initial heat-transfer fluid in the vapor compression circuit by a final transfer fluid, the final transfer fluid exhibiting a lower GWP than the initial heat-transfer fluid, in which the final heat-transfer fluid is a composition as described above.

According to one embodiment, the initial heat-transfer fluid is 2,2-dichloro-1,1,1-trifluoroethane.

The invention also relates to the use of the abovementioned composition as solvent.

The invention also relates to the use of the abovementioned composition as blowing agent.

The invention also relates to the use of the abovementioned composition as propellant, preferably for an aerosol.

The invention also relates to the use of the abovementioned composition as cleaning agent.

The present invention makes it possible to meet the needs felt in the state of the art. It more particularly provides novel low-GWP compositions which are non toxic to the ozone layer and which are capable of being used (inter alia) as heat-transfer fluids, in particular as a replacement for ordinary heat-transfer fluids and very particularly HCFC-123.

In particular, the invention provides, in some embodiments, azeotropic or quasi-azeotropic compositions.

In some embodiments, the invention provides heat-transfer fluids which exhibit good energy performances in comparison with ordinary heat-transfer fluids and in particular in comparison with HCFC-123, especially a similar, indeed even improved, volumetric capacity and/or a similar, indeed even improved, coefficient of performance. According to some embodiments, the replacement of HCFC-123 can be carried out without modifying the heat-transfer installation or its operating parameters.

BRIEF DESCRIPTION OF THE FIGURES

FIG. 1 represents the normal boiling point in ° C. of the Z-HFO-1336mzz/2,4,4,4-tetrafluorobut-1-ene mixture (on the ordinate) as a function of the mass fraction of Z-HFO-1336mzz in the mixture (on the abscissa).

DESCRIPTION OF EMBODIMENTS OF THE INVENTION

The invention is now described in more detail and without implied limitation in the description which follows.

Unless otherwise mentioned, throughout the patent application, the proportions of compounds indicated are given as molar percentages.

According to the present patent application, the global warming potential (GWP) is defined with respect to carbon dioxide and with respect to a duration of 100 years, according to the method indicated in "The Scientific Assessment of Ozone Depletion, 2002, a Report of the World Meteorological Association's Global Ozone Research and Monitoring Project".

The term "heat-transfer compound", respectively "heat-transfer fluid" (or refrigerant), is understood to mean a compound, respectively a fluid, capable of absorbing heat on evaporating at low temperature and low pressure and of discharging heat on condensing at high temperature and high pressure, in a vapor compression circuit. Generally, a heat-transfer fluid can comprise just one, two, three or more than three heat-transfer compounds.

The term "heat-transfer composition" is understood to mean a composition comprising a heat-transfer fluid and optionally one or more additives which are not heat-transfer compounds for the application envisaged.

The additives can in particular be chosen from lubricants, stabilizing agents, surfactants, tracers, fluorescent agents, odorous agents and solubilizing agents.

The stabilizing agent or agents, when they are present, preferably represent at most 5% by weight in the heat-transfer composition. Mention may in particular be made, among the stabilizing agents, of nitromethane, ascorbic acid, terephthalic acid, azoles, such as tolutriazole or benzotriazole, phenolic compounds, such as tocopherol, hydroquinone, t-butylhydroquinone or 2,6-di(tert-butyl)-4-methylphenol, epoxides (alkyl, optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphonates, thiols and lactones.

Use may in particular be made, as lubricants, of oils of mineral origin, silicone oils, paraffins of natural origin, naphthenes, synthetic paraffins, alkylbenzenes, poly($\alpha$-olefin)s, polyalkene glycols, polyol esters and/or polyvinyl ethers.

Mention may be made, as tracers (agents capable of being detected), of deuterated or nondeuterated hydrofluorocarbons, deuterated hydrocarbons, perfluorocarbons, fluoroethers, brominated compounds, iodinated compounds, alcohols, aldehydes, ketones, nitrous oxide and the combinations of these. The tracer is different from the heat-transfer compound or compounds making up the heat-transfer fluid.

Mention may be made, as solubilizing agents, of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat-transfer compound or compounds making up the heat-transfer fluid.

Mention may be made, as fluorescent agents, of naphthalimides, perylenes, coumarins, anthracenes, phenanthracenes, xanthenes, thioxanthenes, naphthoxanthenes, fluoresceins and the derivatives and combinations of these.

Mention may be made, as odorous agents, of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and the combinations of these.

The heat-transfer process according to the invention is based on the use of an installation comprising a vapor compression circuit which contains a heat-transfer fluid. The heat-transfer process can be a process in which a fluid or a body is heated or cooled.

The vapor compression circuit containing a heat-transfer fluid comprises at least one evaporator, one compressor, one condenser and one expansion device, and also lines for transporting heat-transfer fluid between these components. The evaporator and the condenser comprise a heat exchanger which makes possible an exchange of heat between the heat-transfer fluid and another fluid or body.

Use may in particular be made, as compressor, of a single-stage or multistage centrifugal compressor or a centrifugal minicompressor. Rotary, piston or screw compressors can also be used. The compressor can be driven by an electric motor or by a gas turbine (for example fed by the exhaust gases from a vehicle, for mobile applications) or by gears.

The installation can comprise a turbine in order to generate electricity (Rankine cycle).

The installation can also optionally comprise at least one heat-exchange fluid circuit used to send heat (with or without change in state) between the heat-transfer fluid circuit and the fluid or body to be heated or cooled.

The installation can also optionally comprise two (or more) vapor compression circuits containing identical or distinct heat-transfer fluids. For example, the vapor compression circuits can be coupled to one another.

The vapor compression circuit operates according to a conventional vapor compression cycle. The cycle comprises the change in state of the heat-transfer fluid from a liquid phase (or liquid/vapor two-phase system) to a vapor phase at a relatively low pressure, then the compression of the fluid in the vapor phase up to a relatively high pressure, the change in state (condensation) of the heat-transfer fluid from the vapor phase to the liquid phase at a relatively high pressure, and the reduction in the pressure in order to recommence the cycle.

In the case of a cooling process, heat resulting from the fluid or body which is cooled (directly or indirectly, via a heat-exchange fluid) is absorbed by the heat-transfer fluid, during the evaporation of the latter, this taking place at a relatively low temperature with respect to the environment. The cooling processes comprise air conditioning (with mobile installations, for example in vehicles, or stationary installations), refrigeration and freezing or cryogenic processes.

In the case of a heating process, heat is given up (directly or indirectly, via a heat-exchange fluid) by the heat-transfer fluid, during the condensation of the latter, to the fluid or body which is heated, this taking place at a relatively high temperature with respect to the environment. The installation which makes it possible to carry out the heat transfer is known in this case as a "heat pump".

It is possible to employ any type of heat exchanger for the use of the heat-transfer fluids according to the invention and in particular cocurrentwise heat exchangers or, preferably, countercurrentwise heat exchangers.

The heat-transfer fluids used in the context of the present invention are compositions comprising Z-HFO-1336mzz and 2,4,4,4-tetrafluorobut-1-ene.

According to one embodiment, these heat-transfer fluids can comprise one or more additional heat-transfer compounds.

These additional heat-transfer compounds can be chosen in particular from hydrocarbons, hydrofluorocarbons, ethers, hydrofluoroethers and fluoroolefins.

According to these specific embodiments, the heat-transfer fluids according to the invention can be ternary compositions (consisting of three heat-transfer compounds) or quaternary compositions (consisting of four heat-transfer compounds), in combination with the lubricating oil, in order to form the heat-transfer compositions according to the invention.

When additional heat-transfer compounds are present, it is preferable for their total proportion in the above heat-transfer fluids to be less than or equal to 20%, or less than or equal to 15%, or less than or equal to 10%, or less than or equal to 5%, or less than or equal to 2%.

According to one embodiment, the heat-transfer fluids are composed essentially of a mixture of Z-HFO-1336mzz and 2,4,4,4-tetrafluorobut-1-ene, indeed even consist of such a mixture (binary compositions).

Impurities can be present in such heat-transfer fluids, in a proportion of less than 1%, preferably less than 0.5%, preferably less than 0.1%, preferably less than 0.05% and preferably less than 0.01%.

According to specific embodiments, the proportion of Z-HFO-1336mzz in the heat-transfer fluid can be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

According to specific embodiments, the proportion of 2,4,4,4-tetrafluorobut-1-ene in the heat-transfer fluid can be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

Among the above heat-transfer fluids, some exhibit the advantage of being azeotropic or quasi-azeotropic.

The term "quasi-azeotropic" denotes the compositions for which, at a constant temperature, the saturated liquid pressure and the saturated vapor pressure are virtually identical (the maximum difference in pressure being 10%, indeed even advantageously 5%, with respect to the saturated liquid pressure).

For "azeotropic" compositions, at a constant temperature, the maximum difference in pressure is in the vicinity of 0%.

Such heat-transfer fluids exhibit an advantage of ease of use. In the absence of significant glide, there is no significant change in the circulating composition and no significant change either in the composition in the event of leakage.

FIG. 1 represents the normal boiling point of the heat-transfer fluid as a function of the mass proportion of Z-HFO-1336mzz in the mixture. The calculation of the normal boiling point as a function of the composition is based on data measured in the laboratory (temperature, pressure, critical point, liquid/vapor equilibrium, and the like) or estimated according to methods of estimation by group contribution or by corresponding state. These methods are described in the work "*The Properties of Gases and Liquids*", $5^{th}$ edition, Bruce E. Poling, and are also available in software, such as ASPEN or ThermoDataEngine (NIST).

Advantageously, the compositions according to the invention are nonflammable, within the meaning of the standard ASHRAE 34-2007, and preferably with a test temperature of 60° C. instead of 100° C.

In addition, some compositions according to the invention exhibit improved performances in comparison with some known heat-transfer fluids, in particular for moderate-temperature cooling processes, that is to say those in which the temperature of the cooled fluid or body is from −15° C. to 15° C., preferably from −10° C. to 10° C., more particularly preferably from −5° C. to 5° C. (ideally approximately 0° C.).

Furthermore, some compositions according to the invention exhibit improved performances in comparison with some known heat-transfer fluids, in particular for moderate-temperature heating processes, that is to say those in which the temperature of the heated fluid or body is from 30° C. to 80° C., preferably from 35° C. to 55° C., or particularly preferably from 40° C. to 50° C. (ideally approximately 45° C.).

In the "moderate-temperature cooling or heating" processes mentioned above, the inlet temperature of the heat-transfer fluid in the evaporator is preferably from −20° C. to 10° C., in particular from −15° C. to 5° C., more particularly preferably from −10° C. to 0° C. and for example approximately −5° C.; and the temperature of the start of the condensation of the heat-transfer fluid in the condenser is preferably from 25° C. to 90° C., in particular from 30° C. to 70° C., more particularly preferably from 35° C. to 55° C. and for example approximately 50° C. These processes can be refrigeration, air conditioning or heating processes.

Some compositions are also appropriate for high-temperature heating processes, that is to say those in which the temperature of the heated fluid or body is greater than 90° C., for example greater than or equal to 110° C. or greater than or equal to 130° C., and preferably less than or equal to 160° C.

Some compositions according to the invention exhibit improved performances in comparison with some known heat-transfer fluids, in particular for low-temperature refrigeration processes, that is to say those in which the temperature of the cooled fluid or body is from −40° C. to −10° C., preferably from −35° C. to −25° C., more particularly preferably from −30° C. to −20° C. (ideally approximately −25° C.).

In the "low-temperature refrigeration" processes mentioned above, the inlet temperature of the heat-transfer fluid in the evaporator is preferably from −45° C. to −15° C., in particular from −40° C. to −20° C., more particularly preferably from −35° C. to −25° C. and for example approximately −30° C.; and the temperature of the start of the condensation of the heat-transfer fluid in the condenser is preferably from 25° C. to 80° C., in particular from 30° C. to 60° C., more particularly preferably from 35° C. to 55° C. and for example approximately 40° C.

The compositions according to the invention can be used to replace various heat-transfer fluids in various heat-transfer applications, for example in air conditioning. For example, the compositions according to the invention can be used to replace:
  1,1,1,2-tetrafluoroethane (R134a);
  1,1-difluoroethane (R152a);
  1,1,1,3,3-pentafluoropropane (R245fa);
  mixtures of pentafluoroethane (R125), 1,1,1,2-tetrafluoroethane (R134a) and isobutane (R600a), namely the R422 products;
  chlorodifluoromethane (R22);
  the mixture of 51.2% chloropentafluoroethane (R115) and 48.8% chlorodifluoromethane (R22), namely R502;
  any hydrocarbon;
  the mixture of 20% difluoromethane (R32), 40% pentafluoroethane (R125) and 40% 1,1,1,2-tetrafluoroethane (R134a), namely R407A;
  the mixture of 23% difluoromethane (R32), 25% pentafluoroethane (R125) and 52% 1,1,1,2-tetrafluoroethane (R134a), namely R407C;
  the mixture of 30% difluoromethane (R32), 30% pentafluoroethane (R125) and 40% 1,1,1,2-tetrafluoroethane (R134a), namely R407F;
  R1234yf (2,3,3,3-tetrafluoropropene);
  R1234ze (1,3,3,3-tetrafluoropropene).

In addition, the following preferred compositions are very particularly appropriate for the replacement of HCFC-123:
  from 5% to 70% of 2,4,4,4-tetrafluorobut-1-ene and from 30% to 95% of Z-HFO-1336mzz;
  preferably from 20% to 65% of 2,4,4,4-tetrafluorobut-1-ene and from 35% to 80% of Z-HFO-1336mzz;
  preferably from 25% to 60% of 2,4,4,4-tetrafluorobut-1-ene and from 40% to 75% of Z-HFO-1336mzz;
  preferably from 28% to 51% of 2,4,4,4-tetrafluorobut-1-ene and from 49% to 72% of Z-HFO-1336mzz.

Use may be made, by way of example, of a composition comprising approximately 28% of 2,4,4,4-tetrafluorobut-1-ene and approximately 72% of Z-HFO-1336mzz.

This is because, in this case, the average molar mass, as well as the boiling point, of the heat-transfer fluid are very close to the molar mass and the boiling point of HCFC-123. Thus, the composition comprising 28% of 2,4,4,4-tetrafluorobut-1-ene and approximately 72% of Z-HFO-1336mzz exhibits an average molar mass of 152.09 g/mol (against 152.93 g/mol for HCFC-123) and a boiling point equivalent to the temperature of HCFC-123.

Thus, the compositions preferred above make it possible to replace HCFC-123 without modifying or virtually without modifying the heat-transfer installation or its operating parameters.

Correspondingly, these preferred compositions are particularly appropriate for all the applications in which HCFC-123 is generally used. Thus it is that these preferred compositions are particularly appropriate for use as heat-transfer fluids in heat-transfer installations comprising centrifugal compressors and in particular direct-drive centrifugal compressors. These compressors are more efficient and less expensive than compressors with a change-speed box.

The centrifugal compressors can be driven by an electric motor, a steam turbine, a gas turbine, a heat engine or other.

Preferably, the speed of sound obtained is close to that obtained with HCFC-123 and/or the volumetric capacity obtained is close to that obtained with HCFC-123 and/or the operating pressure in the condenser is close to that obtained with HCFC-123.

Thus, the compositions preferred above can make it possible to retain a constant speed of rotation of the compressor during the replacement of the HCFC-123.

Likewise, these preferred compositions are particularly appropriate for use as heat-transfer fluids in heat-transfer installations comprising a flooded evaporator.

Furthermore, these preferred compositions are particularly appropriate for use in air conditioning, for example with a temperature in the evaporator of approximately 7° C. and a temperature in the condenser of approximately 35° C., and in installations with average power ranging from 250 kW to 35 MW.

The compositions according to the invention can also be used as blowing agent, propellant (for example for an aerosol), cleaning agent or solvent, in addition to their use as heat-transfer fluids.

As propellant, the compositions according to the invention can be used alone or in combination with known propellants. The propellant comprises, preferably consists of, a composition according to the invention. The active substance which has to be ejected can be mixed with the propellant and inert compounds, solvents or other additives, in order to form a composition to be ejected. Preferably, the composition to be ejected is an aerosol.

As blowing agent, the compositions according to the invention can be included in a blowing composition, which preferably comprises one or more other compounds capable of reacting and of forming a foam or cellular structure under appropriate conditions, as is known to a person skilled in the art.

In particular, the invention provides a process for the preparation of an expanded thermoplastic product comprising first the preparation of a polymeric blowing composition. Typically, the polymeric blowing composition is prepared by plasticizing a polymer resin and by mixing in the compounds of a blowing agent composition at an initial pressure. The plasticizing of the polymer resin can be carried out under the effect of heat, the polymer resin being heated in order to soften it sufficiently to mix in a blowing agent composition. Generally, the plasticizing temperature is close to the glass transition temperature or to the melting point for the crystalline polymers.

Other uses of the compositions according to the invention comprise the uses as solvents, cleaning agents or others. Mention may be made, for example, of vapor degreasing, precision cleaning, the cleaning of electronic circuits, dry cleaning, abrasive cleaning, solvents for the deposition of lubricants and release agents, and other solvent or surface treatments.

The invention claimed is:

1. A composition consisting essentially of 2,4,4,4-tetrafluorobut-1-ene and cis-1,1,1,4,4,4-hexafluorobut-2-ene.

2. The composition as claimed in claim 1, consisting of a mixture of 2,4,4,4-tetrafluorobut-1-ene and cis-1,1,1,4,4,4-hexafluorobut-2-ene.

3. The composition as claimed in claim 1, consisting essentially of, relative to the o al weight of the composition from 5% to 70% of 2,4,4,4-tetrafluorobut-1-ene and from 30% to 95% of cis-1,1,1,4,4,4-hexafluorobut-2-ene.

4. A heat-transfer fluid comprising the composition as claimed in claim 1.

5. The heat-transfer fluid as claimed in claim 4, in which the composition is quasi-azeotropic.

6. The heat-transfer fluid as claimed in claim 4, in which the composition is nonflammable.

7. A heat-transfer composition comprising the composition as claimed in claim 1 and also one or more additives chosen from lubricants, stabilizing agents, surfactants, tracers, fluorescent agents, odorous agents, solubilizing agents and their mixtures.

8. A heat-transfer installation comprising a vapor compression circuit containing a composition as claimed in claim 1 as heat-transfer fluid.

9. The installation as claimed in claim 8, comprising a centrifugal compressor.

10. The installation as claimed in claim 8, comprising a flooded evaporator.

11. The installation as claimed in claim 8, chosen from mobile or stationary installations for heat-pump heating, air conditioning, refrigeration or freezing and Rankine cycles.

12. A process for heating or cooling a liquid or a body by means of a vapor compression circuit containing a heat-transfer fluid, said process successively comprising the evaporation of the heat-transfer fluid, the compression of the heat-transfer fluid, the condensation of the heat fluid and the reduction in pressure of the heat-transfer fluid, in which the heat-transfer fluid is a composition as claimed in claim 1.

13. A process for reducing the environmental impact of a heat-transfer installation comprising a vapor compression circuit containing an initial heat-transfer fluid, said process comprising a stage of replacement of the initial heat-transfer fluid in the vapor compression circuit by a final transfer fluid, the final transfer fluid exhibiting a lower GWP than the initial heat-transfer fluid, in which the final heat-transfer fluid is a composition as claimed in claim 1.

14. The process as claimed in claim 13, in which the initial heat-transfer fluid is 2,2-dichloro-1,1,1-trifluoroethane.

15. A solvent comprising the composition as claimed in claim 1.

16. A blowing agent comprising the composition as claimed in claim 1.

17. A propellant comprising the composition as claimed in claim 1.

18. A cleaning agent comprising the composition as claimed in claim 1.

19. The composition as claimed in claim 1, which is quasi-azeotropic.

20. A heat-transfer installation comprising a heat-transfer composition as claimed in claim 6.

21. The composition as claimed in claim 1, consisting essentially of, relative to the total weight of the composition, from 20% to 65% of 2,4,4,4-tetrafluorobut-1-ene and from 35% to 80% of cis-1,1,1,4,4,4-hexafluorobut-2-ene.

22. The composition as claimed in claim 1, consisting essentially of, relative to the total weight of the composition, from 25% to 60% of 2,4,4,4-tetrafluorobut-1-ene and from 40% to 75% of cis-1,1,1,4,4,4-hexafluorobut-2-ene.

23. The composition as claimed in claim 1, consisting essentially of, relative to the total weight of the composition, from 28% to 51% of 2,4,4,4-tetrafluorobut-1-ene and from 49% to 72% of cis-1,1,1,4,4,4-hexafluorobut-2-ene.

24. A composition consisting of 2,4,4,4-tetrafluorobut-1-ene and cis-1,1,1,4,4,4-hexafluorobut-2-ene.

* * * * *